(12) United States Patent  
Liu et al.

(10) Patent No.: US 10,545,244 B2  
(45) Date of Patent: Jan. 28, 2020

(54) CLOUD-OFFLOADED POSITION CALCULATION WITH ON-DEVICE ACQUISITION

(71) Applicant: Microsoft Technology Licensing, LLC, Redmond, WA (US)

(72) Inventors: Jie Liu, Medina, WA (US); Nissanka Arachchige Bodhi Priyantha, Redmond, WA (US); Lucas N Joppa, Sammamish, WA (US); Qiang Xu, Hamilton (CA)

(73) Assignee: Microsoft Technology Licensing, LLC, Redmond, WA (US)

(*) Notice: Subject to any disclaimer, the term of this patent is extended or adjusted under 35 U.S.C. 154(b) by 288 days.

(21) Appl. No.: 15/624,538

(22) Filed: Jun. 15, 2017

(65) Prior Publication Data

US 2018/0364361 A1  Dec. 20, 2018

(51) Int. Cl.
   *G01S 19/09* (2010.01)

(52) U.S. Cl.
   CPC .................. *G01S 19/09* (2013.01)

(58) Field of Classification Search
   CPC .......... G01S 19/09; G01S 19/24; G01S 19/29; G01S 19/30; G01S 19/34; G01S 19/37; G01S 19/38
   USPC .................................................. 342/357.46
   See application file for complete search history.

(56) References Cited

U.S. PATENT DOCUMENTS

| 5,663,734 | A | 9/1997 | Krasner |
| 6,016,119 | A | 1/2000 | Krasner |
| 6,104,338 | A | 8/2000 | Krasner |
| 8,478,067 | B2 | 7/2013 | Riley et al. |
| 8,635,335 | B2 | 1/2014 | Raleigh et al. |
| 9,323,314 | B1 | 4/2016 | Jia et al. |
| 9,519,568 | B2 | 12/2016 | Kaushik et al. |
| 10,095,556 | B2 * | 10/2018 | Prasad ................... G06F 9/546 |

(Continued)

OTHER PUBLICATIONS

"Argos System", Retrieved from: <<http://www.argos-system.org/>>, Retrieved on: Apr. 5, 2017, 4 Pages.

(Continued)

*Primary Examiner* — Dao L Phan

(74) *Attorney, Agent, or Firm* — Schwegman Lundberg & Woessner, P.A.

(57) ABSTRACT

Methods, systems, and computer programs are presented for cloud-offloaded position calculation with on-device acquisition. One method includes operations for collecting raw global positioning system (GPS) signals for a set of positions, and storing in memory the raw GPS signals. The method further includes processing the raw GPS signals in batch mode at the computing device to obtain acquisition data for the positions, where the processing includes identifying tasks for parallel processing by a graphics processing unit (GPU), performing, by the GPU, the tasks in parallel by assigning each of the tasks to a core processor within the GPU, and combining results from performing the tasks to obtain the acquisition data. Additionally, the method includes an operation for transmitting the acquisition data to a server for calculating locations for the set positions at the server, the server storing the locations and making the locations available for location-tracking applications.

20 Claims, 10 Drawing Sheets

(56) References Cited

U.S. PATENT DOCUMENTS

| | | | |
|---|---|---|---|
| 2010/0253576 | A1 | 10/2010 | Young |
| 2011/0057937 | A1* | 3/2011 | Wu ..................... G06F 15/8023 345/505 |
| 2012/0146850 | A1 | 6/2012 | Liu et al. |
| 2014/0324630 | A1 | 10/2014 | Golden et al. |
| 2015/0061934 | A1 | 3/2015 | Liu et al. |
| 2015/0116151 | A1 | 4/2015 | Liu et al. |
| 2015/0338500 | A1 | 11/2015 | Levin et al. |
| 2017/0045864 | A1 | 2/2017 | Fadell et al. |

OTHER PUBLICATIONS

"Carma Devkit", Retrieved from: <<http://www.seco.com/prods/in/carma-devkit.html>>, Retrieved on: Apr. 5, 2017, 4 Pages.

"CuBLAS", Retrieved from: <<https://developer.nvidia.com/cublas>>, Retrieved on: Apr. 5, 2017, 9 Pages.

"CUDA Zone", Retieved from: <<https://developer.nvidia.com/cuda-zone>>, Retrieved on: Apr. 5, 2017, 8 Pages.

Gallagher, Sean, "Faster GPS that Won't Kill your Battery via the Cloud, and a Crowd",Retrieved from: <<https://arstechnica.com/information-technology/2012/12/faster-gps-that-wont-kill-your-battery-needs-the-cloud-and-a-crowd/>>, Dec. 7, 2012, 4 Pages.

"Jetson TK1", Retrieved from: <<https://www.nvidia.com/object/jetson-tk1-embedded-dev-kit.html>>, Retrieved on: Apr. 5, 2017, 8 Pages.

"OpenCL Zone", Retrieved from: <<http://developer.amd.com/tools-and-sdks/opencl-zone/>>, Retrieved on: Apr. 5, 2017, 2 Pages.

"Programming Guide v8.0", Retrieved from: <<http://docs.nvidia.com/cuda/cuda-c-programming-guide/index.html>>, Retrieved on: Dec. 5, 2018, 1 Page.

Anthony, et al., "Sensing Through the Continent: Towards Monitoring Migratory Birds Using Cellular Sensor Networks", In Proceedings of the 11th International Conference on Information Processing in Sensor Networks, Apr. 16, 2012, pp. 329-340.

Cheng, "Energy-Effcient Query Processing on Embedded CPU-GPU Architectures", In Proceedings of the 11th International Workshop on Data Management on New Hardware, Jun. 1, 2015, 7 Pages.

Gano, Shawn, "JSatTrak", Retrieved from: <<http://www.gano.name/shawn/JSatTrak/>>, Retrieved on: Apr. 5, 2017, 6 Pages.

Grasso, et al., "Energy Effcient HPC on Embedded SoCs: Optimization Techniques for Mali GPU", In Proceedings of the IEEE 28th International Parallel and Distributed Processing Symposium, May 19, 2014, pp. 123-132.

Han, et al., "Data Mining: Concepts and Techniques", In Publication of the Morgan Kaufmann Series in Data Management Systems, Jun. 22, 2011, 1-703, (740 Pages).

Hobiger, et al., "A GPU Based Real-Time GPS Software Receiver", In Proceedings of GPS Solutions, vol. 14, Issue 2, Mar. 2010, pp. 207-216.

Kaplan, et al., "Understanding GPS: Principles and Applications", In Publication of Artech House, 2005, pp. 1-703 (723 Pages).

Liu, et al., "Energy Efficient GPS Sensing with Cloud Offloading", In Proceedings of the 10th ACM Conference on Embedded Network Sensor Systems, Nov. 6, 2012, 14 Pages.

Boree, et al., "A Software-Defined GPS and Galileo Receiver: A Single-Frequency Approach", In Publication of Springer Science and Business Media, Aug. 3, 2007, 6 Pages.

Maghazeh, et al., "General Purpose Computing on Low-Power Embedded GPUs: Has it Come of Age?", In Proceedings of International Conference on Embedded Computer Systems: Architectures, Modeling, and Simulation, Jul. 15, 2013, 10 Pages.

Misra, et al., "Energy Efficient GPS Acquisition with Sparse-GPS", In Proceedings of ACM/IEEE International Conference on Information Processing in Sensor Network, Apr. 17, 2014, 12 Pages.

Mun, et al., "PEIR, The Personal Environmental Impact Report, as a Platform for Participatory Sensing Systems Research", In Proceedings of the 7th International Conference on Mobile Systems, Applications, and Services, Jun. 22, 2009, pp. 55-68.

Navarro, et al., "A Survey on Parallel Computing and its Applications in Data-Parallel Problems Using GPU Architectures", In Journal of Communications in Computational Physics vol. 15, Issue 2, Feb. 2014, pp. 285-329.

Nee, et al., "New Fast GPS Code-Acquisition Technique Using FFT", In Journal of Electronics Letters, vol. 27, No. 2, Jan. 17, 1991, pp. 158-160.

"International Search Report and Written Opinion Issued in PCT Application No. PCT/US2018/034246", dated Sep. 17, 2018, 14 Pages.

Roule, et al., "GNSS Signal Processing in GPU", In Proceedings of Artificial Satellites, vol. 48, Issue 2, Jun. 21, 2013, pp. 51-61.

Zheng, et al., "Urban Computing: Concepts, Methodologies, and Applications", In Journal of ACM Transactions on Intelligent Systems and Technology (TIST), vol. 5, Issue 3, Sep. 2014, 55 Pages.

Wang, et al., "A GPU-Accelerated Face Annotation System for Smartphones", In Proceedings of the 18th ACM International Conference on Multimedia, Oct. 25, 2010, 2 Pages.

Zhang, et al., "Hardware Design Experiences in Zebranet", In Proceedings of the 2nd International Conference on Embedded Networked Sensor Systems, Nov. 3, 2004, 12 Pages.

Zhang, et al., "Large-Scale Spatial Data Processing on GPUs and GPU-Accelerated Clusters", In Publication of SIGSPATIAL Special, vol. 6, Issue 3, Nov. 2014, 8 Pages.

* cited by examiner

CLOUD-OFFLOADED POSITION CALCULATION WITH ON-DEVICE ACQUISITION

TECHNICAL FIELD

The subject matter disclosed herein generally relates to methods, systems, and programs for calculating global positions for wandering devices.

BACKGROUND

Global Navigation Satellite Systems (GNSS) allow devices to calculate their geospatial position based upon signals sent from GNSS satellites. Examples of GNSS include the Global Positioning System (GPS), Global Navigation Satellite System (GLONASS), and Galileo. GNSS satellites carry very stable atomic clocks and continuously broadcast their current time and position which can be utilized by ground-based computing devices with receivers to calculate the computing device's position. For example, the computing devices receive radio transmissions from multiple satellites and calculate their position using constraint optimization techniques such least-squares minimization. Typically, a receiver needs at least 4 visible satellites to determine its location.

Some positioning applications require tracking the position of moving objects, such as wild animals, cars, or cargos. However, calculating position continuously may drain the battery of the computing device and may require the use a large amount of network bandwidth.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
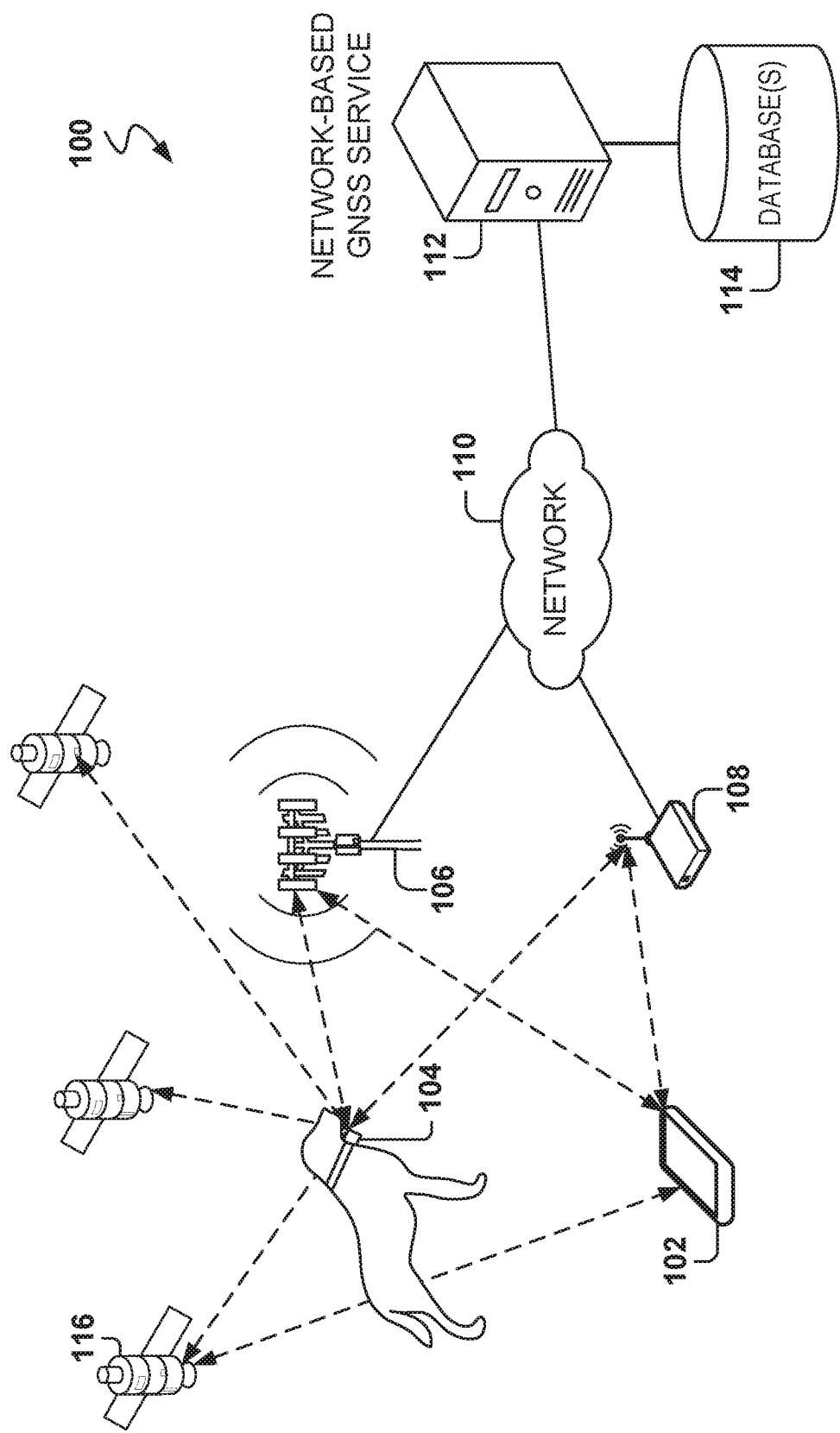
FIG. 1 shows a diagram for offloading global positioning calculation tasks, according to some example embodiments.

Example methods, systems, and computer programs are directed to cloud-offloaded position calculation with on-device acquisition. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Calculation of the position of a device utilizing GNSS includes the collection of GNSS signals, the acquisition of GNSS satellites, and calculations to identify the location based on the acquisition data. Approaches, such as Cloud-Offloaded Global Positioning System (CO-GPS), collect raw GNSS signals and send them to a cloud service, referred to as a network-based GNSS service. The GNSS service performs the acquisition and localization operations. This type of approach achieves substantial energy consumption savings over a standalone GNSS receiver, as acquisition and localization are responsible for the majority of energy-consumption in the position-calculation process.

However, CO-GPS is problematic for many positioning applications because of the high use of network bandwidth and high energy consumption. Disclosed in some examples are methods, systems, devices, and machine-readable mediums which utilize a new GNSS processing method called Cloud-Offloaded, Device-Acquisition Global-Positioning-System (CODA-GPS). CODA-GPS balances the energy efficiency of offloading computations to the cloud with savings in transmission time and energy consumption that such offloading entails.

With CODA-GPS, acquisition is done at the device being tracked. As a result, the workload on the device side is increased compared to CO-GPS. In order to maintain the same level of energy efficiency, an embedded general purpose graphics processing unit (GPGPU), also referred to herein simply as GPU, is utilized for satellite acquisition. Some of the operations required for acquisition are parallelized and then performed by the GPU, which is well-suited for performing the parallel calculations quickly, helping to reduce energy consumption.

Further enhancements may be obtained by hatching the acquisition processing, which saves costs associated with repeatedly waking, from a low powered state, the hardware processor and the GPU that perform the acquisition. Thus, instead of processing the received GNSS signals in real-time, they are processed in batches. The acquisition of signals in the same batch may be performed continuously.

Experimental testing has shown that it is possible to significantly reduce the volume of data transmitted to the cloud for localization by performing device acquisition without compromising enemy efficiency. While the method is termed CODA-GPS and example embodiments are presented with reference to GPS, one of ordinary skill in the art with the benefit of the present disclosure will appreciate that the method will work with other GNSS services.

One general aspect includes a method including an operation for collecting, by one or more processors of a computing device, raw global positioning system (GPS) signals for a plurality of positions. The method also includes storing in memory, by the computing device, the raw GPS signals for the plurality of positions, and processing the raw GPS signals in batch mode at the computing device to obtain acquisition data for the plurality of positions. The processing further includes identifying, by the one or more processors, a plurality of tasks for parallel processing by a graphics processing unit (GPU); performing, by the GPU, the plurality of tasks in parallel by assigning each of the tasks to a core processor within the GPU; and combining, by the one or more processors, results from performing the plurality of tasks to obtain the acquisition data. The method also includes transmitting, by the one or more processors, the acquisition data to a server for calculating locations for the plurality of positions at the server, the server storing the locations and making the locations available for location-tracking applications.

One general aspect includes a system including: a memory including instructions, a graphics processing unit (GPU), and one or more computer processors. The instructions, when executed by the one or more computer processors, cause the one or more computer processors to perform operations including: collecting raw GPS signals for a plurality of positions; storing in the memory the raw GPS signals for the plurality of positions; processing the raw GPS signals in batch mode to obtain acquisition data for the plurality of positions; identifying a plurality of tasks for parallel processing by the GPU, the GPU performing the plurality of tasks in parallel by assigning each of the tasks to a core processor within the GPU; combining results from performing the plurality of tasks to obtain the acquisition data; and transmitting the acquisition data to a server for calculating locations for the plurality of positions at the server, the server storing the locations and making the locations available for location-tracking applications.

One general aspect includes a non-transitory machine-readable storage medium including instructions that, when executed by a machine, cause the machine to perform operations including: collecting, by one or more processors of a computing device, raw global positioning system (GPS) signals for a plurality of positions; storing in memory, by the computing device, the raw GPS signals for the plurality of positions; processing the raw GPS signals in batch mode at the computing device to obtain acquisition data for the plurality of positions. The processing further includes identifying, by the one or more processors, a plurality of tasks for parallel processing by a graphics processing unit (GPU), performing, by the GPU, the plurality of tasks in parallel by assigning each of the tasks to a core processor within the GPU, and combining, by the one or more processors, results from performing the plurality of tasks to obtain the acquisition data; and transmitting, by the one or more processors, the acquisition data to a server for calculating locations for the plurality of positions at the server, the server storing the locations and making the locations available for location-tracking applications.

FIG. 1 shows a diagram for offloading global positioning calculation tasks, according to some example embodiments. Computing devices with GNSS receivers, such as smartphone 102, wildlife tracker 104, and the like, may connect at various times to a wireless network provided by cellular network equipment, such as a cellular base station 106, a Wi-Fi router 108, or the like. The cellular base station 106 and the Wi-Fi router 108 allow the computing devices to communicate over a network, such as network 110 with one or more other computing devices. For example, they may allow the smartphone 102 or the wildlife tracker 104 to communicate with a network-based GNSS service 112.

The smartphone 102, the wildlife tracker 104, and other devices may transmit raw GNSS signals or partially processed GNSS information obtained from one or more satellites 116 (such as an output of the acquisition data) for processing and storage in database 114. In other examples, the smartphone 102 and the wildlife tracker 104 may perform both acquisition and localization on the device to produce position coordinates, e.g., geolocation. The geolocation may be utilized on the device, or may be sent to the network-based GNSS service for networked location-based applications.

The GPS localization is based on having precise time and the known position of the satellites 116. The GPS satellites 116 carry very stable atomic clocks and continuously broadcast their current time and position. There are 32 (one is for redundancy) GPS satellites in the sky, each orbiting the earth about two cycles a day. A set of ground stations monitor and calibrate the satellite parameters. These parameters include the almanac, which contains the precise values of the satellite's trajectory.

All satellites are time-synchronized to within a few microseconds, and after clock correlation, their time stamps can be synchronized within a few nanoseconds. The GPS receiver (e.g., 104), which has a less stable local clock, monitors multiple satellites and calculates its position using constraint optimization techniques such least-squares minimization. Since the receiver does not know the precise satellite time, the time is usually treated as one variable in the minimization solver. Typically, at least four visible satellites are required to determine a location.

The GPS satellites are differentiated by 32 different and highly orthogonal Pseudorandom Noise (PRN) sequences called coarse acquisition (C/A) codes. When a GPS receiver first starts up, the receiver detects what satellites are in view. This is done by detecting the presence of the corresponding C/A codes in the received signal, typically by correlating the signal with each known C/A code template. Since the C/A codes are designed to be orthogonal to each other, a visible satellite will show a spike in the correlation results, and an invisible satellite will not cause any detectable spike.

The purpose of satellite acquisition is to determine visible GPS satellites, and to identify coarse values of the carrier frequency and the code phase of those satellites. In some example embodiments, the acquisition includes: determining which satellites are visible to the antenna; determining the approximate Doppler of each visible satellite; searching for the signal in both C/A-code delay and frequency (i.e., Doppler shift); and detecting a signal and determining its code delay and carrier frequency. Localization involves operations that use the information in the GNSS signals from the set of acquired satellites to calculate a position. These acquisition and localization operations are processor intensive and therefore require a lot of energy to perform. For devices that wish to minimize power consumption, this may be problematic.

CO-GPS helps reducing energy consumption but CO-GPS may be problematic for many positioning applications. One problem is the excessive amount of data to be transferred from the computing device to the cloud server. For computing devices with irregular network connections, the amount of data, that is stored and then transferred when a network connection is found, can be enormous. For example, one GPS location fix in CO-GPS requires turning on the GPS receiver for 10 ms. As a result, 40 KB of signal data are collected for a single location fix (using a 16.368 MHz sampling frequency). If location samples are taken every minute, this accumulates to 60 MB in a day and 420 MB in a week. This excessive data results in long transmission times and a large amount of energy consumption. It also increases device cost because of the large amount of memory necessary to store the data prior to transmission.

As an example, consider the wildlife tracker 104 where the wildlife may not be proximate to a wireless network for long periods of time. When the wildlife tracker 104 finally establishes a connection with the wireless network, the wildlife tracker 104 may have gigabytes of data to transmit. In general, even devices that are connected regularly to a network, such as the smartphone 102 or other Internet of Things (IOT) devices may incur excessive battery usage as a result of the increased data transfers. For example, Table 1 below lists the energy consumption and required time for various wireless technologies to transfer 60 MB of GPS signal data.

TABLE 1

|  | Uplink Throughput | Required Time | Energy |
|---|---|---|---|
| Wi-Fi (IEEE 802.11b) | 0.94 Mbps | 511 s | 204 J |
| 3G | 400 Kbps | 1200 s | 1398 J |
| LTE | 6 Mbps | 80 s | 313 J |

Figure 2:
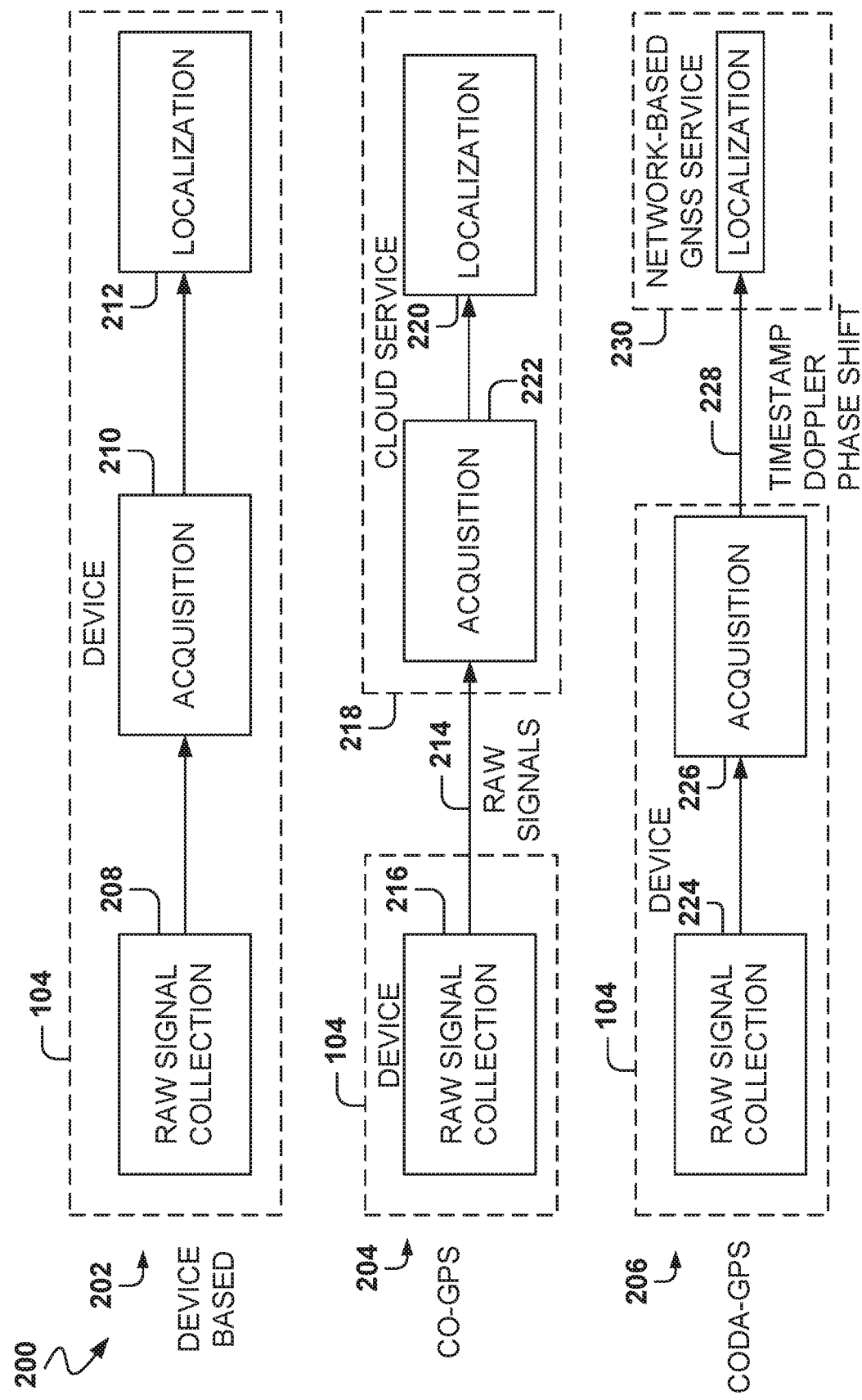
FIG. 2 shows a diagram with different task-division architectures for calculating position of a device, according to some example embodiments.

FIG. 2 shows a diagram 200 with different task-division architectures for calculating position of a device, according to some example embodiments. FIG. 2 illustrates three ways to calculate position: calculating position at the device 202, collecting signals at the device with cloud offload of acquisition and localization (CO-GPS) 204, and collecting signal and acquisition at the device with cloud offload of localization (CODA-GPS) 206.

GPS signal processing can be roughly divided into three steps: GPS signal collection, acquisition, and localization. For device-based GPS 202, all position-calculation operations are performed on the device 104 using the device's computing resources and power, and these operations include raw-signal collection 208, acquisition 210, and localization 212.

For CO-GPS 204, the device 104 acquires raw GPS signals 216 and transfers 214 the raw GPS signals to the cloud service 218, where they are used for acquisition 222 and localization 220. CO-GPS 204 allows a sensing device to aggressively duty-cycle its GPS receiver and log just enough raw GPS signals for post-processing. Leveraging publicly available information, such as GPS satellite ephemeris and an Earth elevation database, a cloud service can derive good quality GPS locations from a few milliseconds of raw data. For example, using the designed sensing platform called. CLEO, CO-GPS can achieve three orders of magnitude lower energy consumption per location tagging compared to more than 30 seconds of heavy signal processing on standalone GPS receivers.

For CODA-GPS 206, the device 104 collects the raw GNSS signals 224 and does the acquisition 226. The device 104 then sends 228 the results of the acquisition, such as timestamps, Doppler, and phase shift information, to the network-based GNSS service 230, where the localization is performed.

Of the three steps for GPS signal processing, acquisition and localization contribute the most to energy-consumption and hence are offloaded to the cloud in CO-GPS to achieve energy efficiency on the device. CO-GPS collects GPS baseband signal for a few milliseconds and offloads all the post-processing tasks to the cloud. Excessive data transfer means long transmit time and a large amount of energy consumption which makes CO-GPS inappropriate in many scenarios. Examples include GPS sensing applications in wild environment, such as wild life tracking, asset tracking, and participatory environmental sensing. In these applications, it is impossible or difficult to access the tracked objects after deployment. Therefore, the collected data cannot be extracted manually and have to be uploaded to the server through wireless infrastructure such as satellite, 3G, LTE, or Wi-Fi.

GPS acquisition is computationally expensive. Therefore, one goal of CODA-GPS is to make the acquisition energy-efficient so the overall energy-efficiency goal on the device side is not compromised. With CODA-GPS, it is possible to take advantage of the cloud offloading strategy in terms of energy efficiency, without paying for the high volume data transfer cost. CODA-GPS allows to perform acquisitions on devices efficiently and only offload the localization process to the cloud. There are at least two benefits of conducting acquisition on the device. First, only acquisition results, which include only a few bytes per satellite to record code phases and Doppler shifts, need to be transferred to the cloud. Therefore, the inherent problem of excessive data transfer in CO-GPS is mitigated. Second, compared to device-only GPS 202, CODA-GPS 206 still saves the majority of energy used to decode satellite data, such as precise time stamps and ephemeris.

Figure 3:
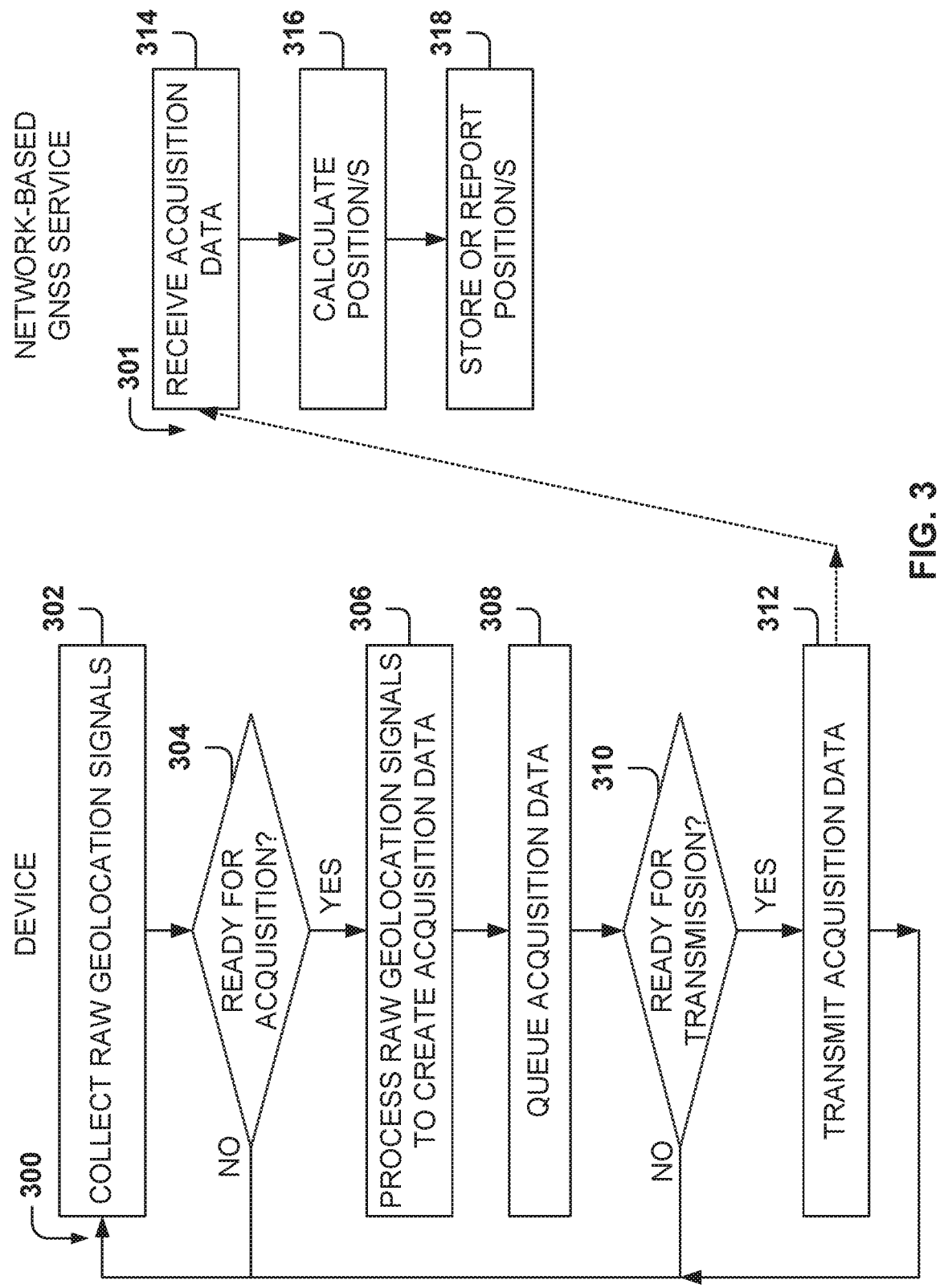
FIG. 3 is a flowchart of a method for a Cloud-Offloaded Device Acquisition Global Positioning System (CODA-GPS), according to some example embodiments.

FIG. 3 is a flowchart 302 of a method for CODA-GPS, according to some example embodiments. While the various operations in these flowcharts are presented and described sequentially, one of ordinary skill will appreciate that some or all of the operations may be executed in a different order, be combined or omitted, or be executed in parallel.

At operation 302, the computing device receives and collects the raw GPS signals. Since the baseband. C/A code repeats every millisecond, 1 ms of data is enough for acquisition in the ideal case. Assuming a 16 MHz baseband sampling frequency, the minimum amount of data needed for acquisition is 16*1023, which is 16,368 samples. For many GPS receiver chips, each sample is two bits (one bit sign and one bit magnitude), thus the storage requirement for 1 ms of baseband signal is 4 KB. In one corner case, the bit transition is in the middle of the 1 ms signal. Since the C/A code is used to modulate the data packets at 50 bps, there is a possibility of bit transition for every 20 ms. Since the acquisition of the corresponding satellite will fail if the bit transition is the middle of the 1 ms signal, 2 ms of baseband signal (also called a chunk) is more reliable for satellite acquisition. To improve the localization accuracy, multiple chunks of data are usually collected, e.g., five chunks. Therefore, in some example embodiment, the size of collected data for a single location tagging is 40 KB by default.

A challenge in acquiring satellites is the Doppler frequency shift caused by the motion of the satellite and by any movement of the receiver on the ground. For example, a rising GPS satellite can move at up to 800 m/s towards a receiver, causing a frequency shift of L1*800/c, which is equal to 4.2 kHz, where c is the speed of light. A shift of the same magnitude occurs in the opposite direction for a setting satellite. To reliably compute a correction under this shift, the receiver must generate the C/A code within 500 Hz of the shifted frequency. Therefore, in the frequency dimension, the receiver searches up to 18 bins. For example, many GPS receivers use 25 to 40 frequency bins to accommodate local receiver motion and to provide better receiver sensitivity.

After compensating for the Doppler frequency shifts, the receiver must determine code phase delays. Because the receiver may not have a clock synchronized with the satellite, and because the signal propagation delay can be affected by atmospheric conditions, the receiver must search over the delay dimension. The receiver usually oversamples the 1023 bps C/A code, and assuming that the receiver samples the baseband signal at 8 MHz, in a brute force way, the receiver will search 8184 code phase positions to find the best correlation peak. Therefore, acquisition is an expensive operation as it must search through more than 30 frequency bins times 8,000 plus code phase possibilities for every single satellite.

However, acquisition may be accelerated by several methods: continuous tracking, prior assisted, and parallel searching. With continuous tracking, code phases change over time as the satellites and the device on the ground move. In continuous operation, GPS receivers use a tracking mode to adjust previously acquired Doppler frequency shifts and code phases to the new ones. This is a relatively inexpensive process using feedback loops. Thus, once a GPS receiver produces its first location fix, subsequent location estimates become fast. However, once the GPS receiver stops tracking, the utility of previously known Doppler shifts and code phases diminishes quickly. Typically, after 30 seconds of non-tracking, the GPS receiver has to start all over again. One typical scenario for continuous tracking is navigation. Unfortunately, continuous tracking cannot help in long-term tracking applications in which the interval of location sampling is usually greater than 30 s.

Another way to accelerate acquisition is to take advantage of some prior information, a method referred to as prior assisted. A typical example is Assisted GPS (A-GPS). When the receiver has no prior knowledge of the satellites and its own location, the receiver has to search the entire space. This is one of the main reasons for the slow initial position fix and high energy consumption for standalone GPS devices. However, there are multiple ways that an infrastructure can help GPS receivers start up faster. In particular, in the Mobile Station Based A-GPS (or AGPS-B) mode, the infrastructure provides the up-to-date ephemeris data so that the GPS receiver does not have to decode them from the satellite signals. The first successful decodes of HOW is enough to provide a location fix. In the Mobile-Station Assisted A-GPS (or AGPS-A) mode, the infrastructure is given the estimated location, so it can provide initial values for Doppler and code phase searches. This mechanism has been widely applied to smartphone locations. However, the sensor nodes for both CO-GPS and CODA-GPS are not connected to any infrastructure. Even if there is an infrastructure for CODA-GPS, Wi-Fi, the sensor node may only connect to the access point opportunistically.

Serial search acquisition is an often-used method for acquisition in code-division multiple access systems (CDMA) (GPS is a CDMA system). However, serial search is a time-consuming procedure to search sequentially through all possible values of the Doppler frequency and code phase. The performance of the procedure may be improved significantly if the search procedure is implemented in parallel. Both of the two parameters, Doppler frequency and code phase, may be parallelized, which implies parallel frequency space search acquisition and parallel code space search acquisition. These parallel methods use the Fourier Transform in frequency space or code space, respectively, and are inherently parallel approaches. The parallel code space search outperforms parallel frequency space search because the amount of search steps in the code phase dimension is significantly larger than that of the frequency dimension. More details are provided below for the serial search and the parallel code space search acquisition for comparison with reference to FIGS. 6 and 7.

At operation 304, the system checks if an acquisition processing condition has been reached. For example, if a certain amount of time has passed since the last acquisition, a certain amount of raw signal data has been collected, a memory device is nearing capacity, the system is within range of a wireless network for transferring data, the system's hardware processor has woken up for a reason not related to GPS processing, a new set of GNSS geolocation signals have arrived, or the like. If an acquisition processing condition has not been reached, then the computing device may continue to collect raw geolocation signals at operation 302. If the device is ready to perform acquisition, the method flows to operation 306.

In some example embodiments, a threshold amount of data is accumulated and when the device has enough energy, the GPU is awakened, the GPU processes the acquisition data to obtain the code phrase and Dopplers, and the GPU is put to sleep again.

At operation 306, the raw geolocation signals are processed to create an acquisition data set. The acquisition data set may be time-stamped for correlation of the acquired satellites and geolocation data with a position later calculated using the acquisition data set.

In some example embodiments, the raw geolocation signals are processed with the GPU, which is well suited for GPS acquisition. With an embedded GPU, instead of hard-coding the acquisition algorithm as in CO-GPS, different acquisition algorithms may be plugged or unplugged easily in CODA-GPS.

Further, a duty-cycle strategy is used for GPU-assisted device acquisition. Instead of processing GPS signals in real time, with CODA-GPS, data is stored in flash, or some other memory, and then the data is processed in batch. This amortizes the relatively expensive process of waking up the GPU and setting the GPU into the acquisition mode.

By processing data batch by batch, the GPU is sleeping for most of the time and is only activated as needed and when the conditions permit. In some example embodiments, the acquisitions of signals in the same batch is performed continuously. Given a batch of baseband signal data, which are continuously collected from different locations, the proposed continuous processing strategy scans all the 32 satellites to get the observed satellites. Then, based on the acquisition results, the visible satellites are predicted and only the predicted satellites are scanned during the next acquisition.

Further, in some example embodiments, the "principle of locality" of visible satellites is used to avoid brute force testing for all possible satellites during acquisition. Specifically, a visible-satellites prediction algorithm is used that is based on the historical acquisition results, which reduces the search space for each acquisition.

From operation 306, the method flows to operation 308 where the acquisition data is queued for later processing. At operation 310, a check is made to determine if the acquisition data is ready for transmittal. For example, the condition may be any of a certain amount of time has passed since the last transmission, a certain amount of acquisition data has been collected, a memory device is nearing capacity, the system is within range of a wireless network for transferring data, the system's hardware processor has woken up for a reason not related to GPS processing, the device has collected enough energy to transmit, or the like. If the acquisition data is ready for transmittal, the method flows to operation 312, otherwise the method flows to operation 300 to continue collecting raw geolocation signals. In some embodiments, the device may be put to sleep if the memory for storing raw geolocation signals is full, and the device may be periodically awakened to check if the device is able to transmit.

At operation 312, the computing device transmits the acquisition data sets in storage to a network-based GPS service. Each set of acquisition data may be utilized by the network-based GPS service to calculate the position of the computing device at the time indicated by the corresponding timestamp and may comprise each acquired satellite's code phases and Doppler shifts, as well as the timestamp.

Flowchart 301 indicates the operations performed by the network-based GNSS service, which include operation 314 for receiving the acquisition data sent by the computing device. At operation 316, the position or positions associated with the received acquisition data are calculated, and at operation 318, the calculated positions are stored in a database or reported to another device that is subscribed to receive the position information.

CODA-GPS reduces the amount of ready that needs to be transmitted for calculating locations. Additionally, CODA-GPS allows optimizing the use of available energy, by batching acquisition operations. This is useful in applications such as animal tracking where a tag includes a solar panel for collecting energy. The solar panel collects energy during the day, or when the animal is in sunlight, but the target collects no energy at night. Some animals may move a lot during the night, so a balance between available energy and motion has to be considered. For example, when there is not enough energy for transmission, the tag just stores the data, and when enough energy for transmission is available (e.g., the next day after the sun rises), the data is processed and then transmitted.

Figure 4:
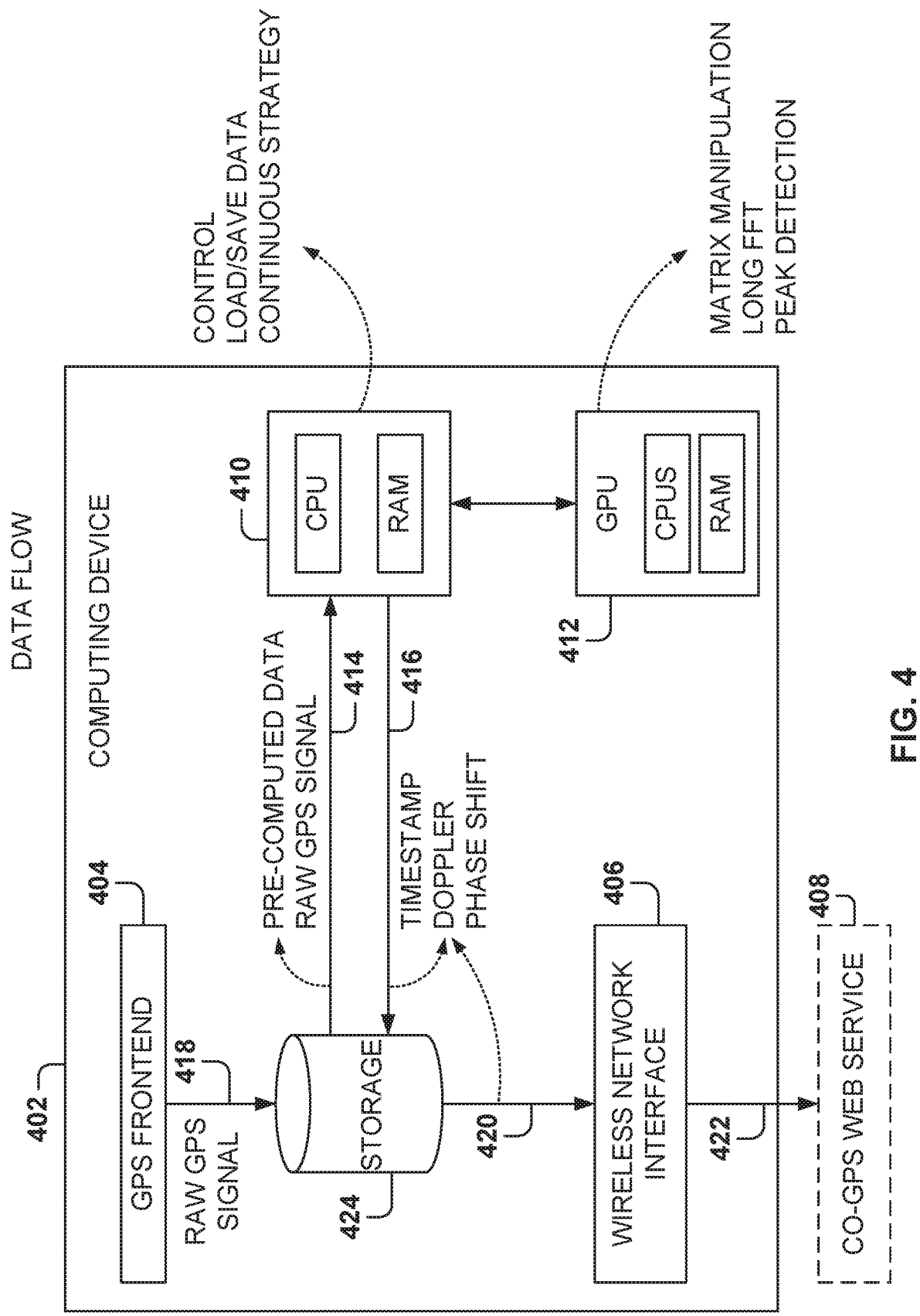
FIG. 4 illustrates the data flow within the different components of the computing device for calculating position, according to some example embodiments.

FIG. 4 illustrates the data flow within the different components of the computing device 402 for calculating position, according to some example embodiments. Since acquisition is notoriously computing-intensive, a GPU 412 is utilize in the computing device 402, also referred to as the sensor node. The GPU 412 is usually thought as high-energy consumer because of its high instantaneous power needs. However, the present embodiments enable having both powerful parallelization and great energy efficiency. As it is well known, energy consumption can be expressed as power times time. Reducing either power or time helps to reduce energy consumption. In some implementations, both factors are optimized.

In addition to application-specific functionality such as sensing with other modalities, the computing device 402 includes a GPS frontend 404, a data storage 424, a CPU 410 with a processor and memory, a GPU 412, and a wireless network interface 406, also referred to herein as the data transfer module.

When the computing device 402 device needs to sense its location, the GPS frontend 404 is turned on to record a few milliseconds of GPS baseband signal, also referred to herein as raw GPS signal, which is sent 418 to storage 424. In some example embodiments, at least 2 ms worth of data is required to avoid possible bit boundaries. The signal data is stored for further processing (e.g., satellite acquisition). Instead of processing the raw GPS signal in real time, the device processes reasonably large pieces of data (e.g. signal data collected in one day or one week) in batch mode.

The CPU 410 retrieves 414 the stored raw GPS signals and works with the GPU 412 to generate the acquisition results (e.g., time stamps, Doppler shifts and code phases) that are stored 416 in storage 424. Once the acquisition is finished, the raw signal data is deleted. The GPU 412 is utilized for processing intensive tasks, such as metrics manipulations, long Fast Fourier Transforms (FFT), and peak detections.

The wireless network interface 406 is activated to transfer the cached acquisition results to the cloud, e.g., the CO-GPS web service 408, when a signal from the access point is captured.

Figure 5:
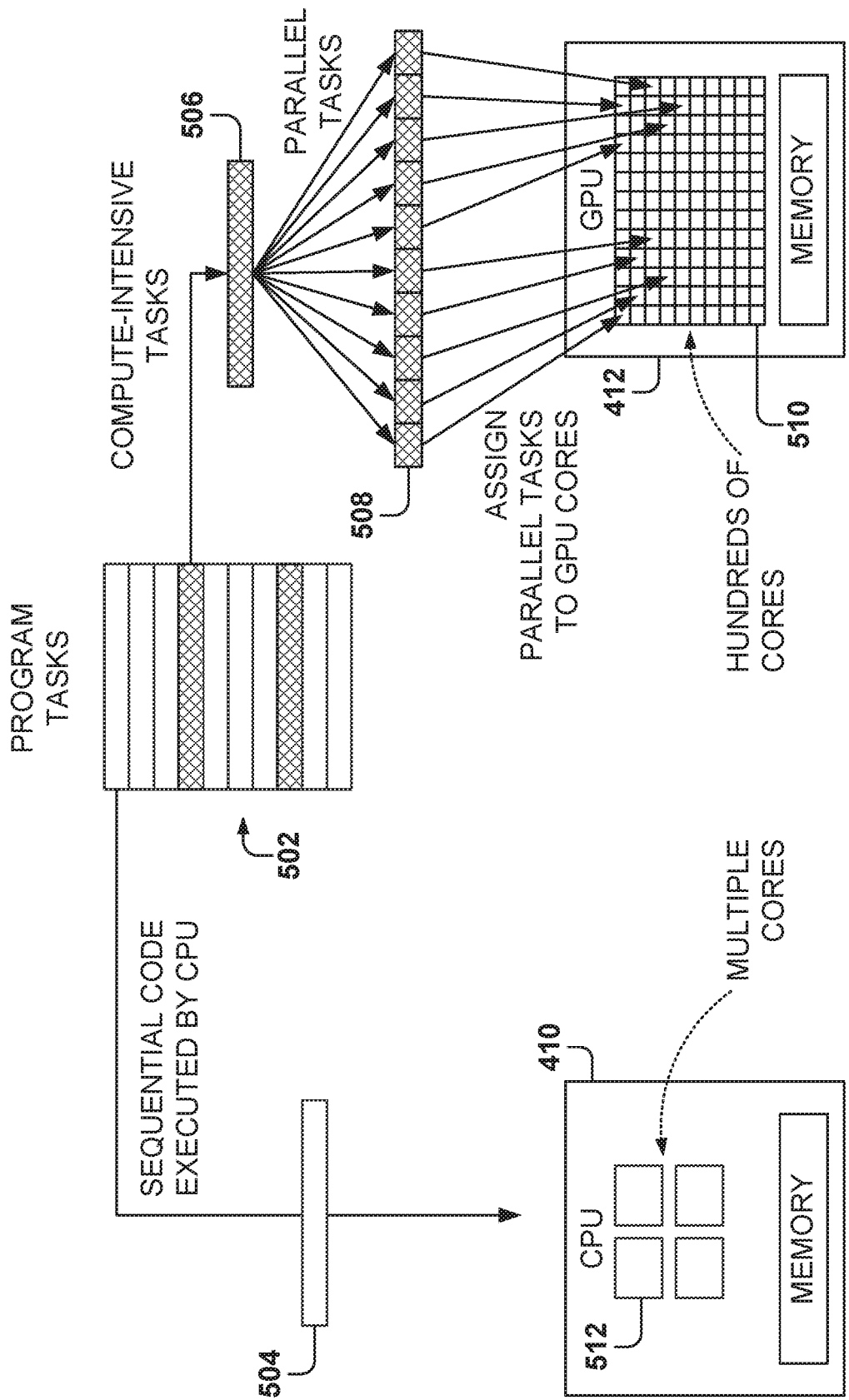
FIG. 5 illustrates the advantages of using graphics processing units (GPUs) for parallelizing tasks, according to some example embodiments.

FIG. 5 illustrates the advantages of using graphics processing units (GPUs) 412 for parallelizing tasks, according to some example embodiments. As discussed above, the purpose of acquisition is to determine visible satellites and coarse values of carrier frequency and code phase of the satellite signals. Since acquisition is notoriously computing intensive, application-specific integrated circuits (ASIC) have been utilized to perform the acquisition in some implementations.

Common wisdom tells us GPU is the enemy of low-power applications, which is true in most scenarios. The high-performance demands on GPUs have influenced their design to be optimized for higher performance, even at the cost of large power consumption. The instantaneous power of GPU is high even when a low-power embedded GPU is used. For example, some GPUs use between 0.6 W to 3 W of power during normal use and rarely use more than 4 W. Although a few watts of power is low already, this amount of power is still a challenge for long-term GPS sensing platforms which require extreme energy efficiency. However, in some example embodiments, the GPU 412 is utilized for acquisition tasks because the GPU is well suited for data-parallel problems and the high energy consumption is offset because the speed of processing provided by the GPU. Additionally, more efficient acquisition algorithms may be achieved with the assistance of a GPU.

In general, program tasks 502 are executed by the computing device. Some program tasks 504 are better suited for sequential execution by the CPU 410, while other computing-intensive tasks 506 are better suited for parallel processing.

One of the main differences between the CPU 410 and the GPU 412 is that the CPU 410 includes a few processor cores while the GPU 412 may include hundreds of processor cores. In addition, the CPU 410 and the GPU 412 may include respected memories. The computing-intensive tasks 506 are divided into a plurality of parallel tasks that are assigned to a respective core 510 in the GPU 412.

In parallel computing, there are two types of problems: task-parallel problems and data-parallel problems. The data-parallel problems are ideal for accelerated processing by the GPU 412. The GPU architecture works better when all threads execute the same instructions but on different data, and hence data-parallel problems are best suited for the GPU. For example, matrix multiplication and addition, large discrete Fourier transforms, and maximum and minimum calculations are problems of this kind.

Further, GPUs are better for acquisition tasks than ASIC circuits or FPGAs, because the GPU is more flexible than a fixed circuit. For example, with the GPU, it is possible to trade off on the sampling rate of the signal: if there is a strong signal, it is possible to down-sample the signals and still get a good result.

To make use of the GPU possible for extreme energy efficiency applications, two factors are considered: improving the throughput of the GPU and optimizing the duty cycle of the GPU. To improve the throughput of acquisition, in-depth customized acquisition algorithms are implemented to make full use of the CPU-GPU architecture. Specifically, not only the acquisition for a single satellite is optimized, but also the search space is reduced by introducing what's called a lazy acquisition strategy (e.g., perform acquisition in batches) and predicting potential visible satellites. As for the power, the instantaneous power is changed by changing the clock frequencies of CPU and GPU, in some example embodiments. Two customized acquisition algorithms are presented below, serial search described in FIG. 6 and parallel code phase search described in FIG. 7.

Figure 6:
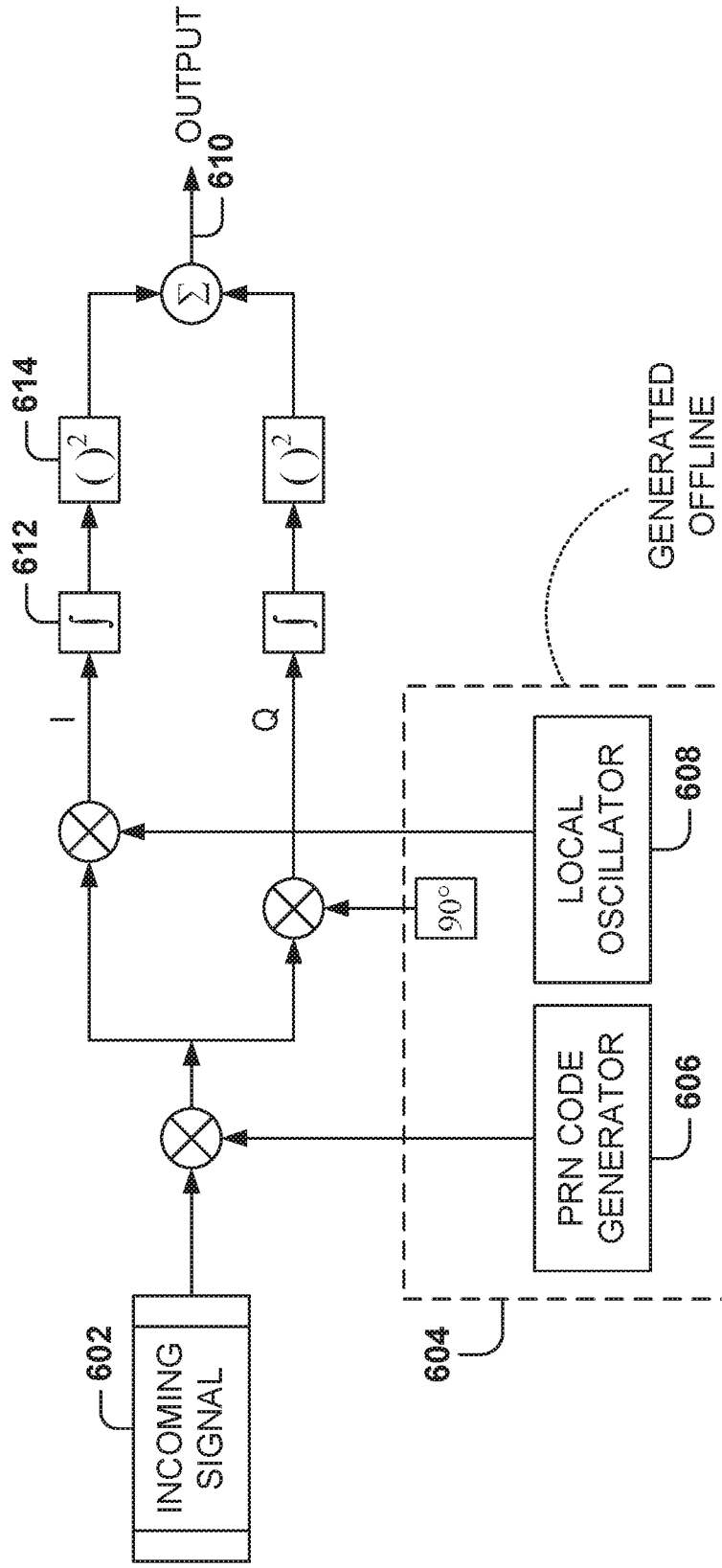
FIG. 6 is a block diagram of serial search acquisition, according to some example embodiments.

FIG. 6 is a block diagram of serial search acquisition, according to some example embodiments. Serial search acquisition may be used for acquisition in code-division multiple access systems (CDMA), such as GPS. As illustrated in FIG. 6, the algorithm is based on multiplication of locally generated PRN code sequences (generated by PRN code generator 606) and locally generated carrier signals (generated by local oscillator 608).

In some example embodiments, the PRN code generator 606 generates PRN sequences for all 32 satellites. Each generated sequence has a unique code phase, from 0 to 1022 chips. The incoming signal 602 is initially multiplied by this locally generated PRN sequence, and after multiplication with the PRN sequence, the signal is multiplied by a locally generated carrier signal and a 90° phase-shifted version of the locally generated carrier, generating the in-phase signal I and the quadrature signal Q respectively. The I and Q signals are integrated 612 over 1 ms corresponding to the length of one PRN code, and finally squared 614 and added to generate output 610.

The baseband signal is represented as X[n], and the generated PRN sequence is denoted as PRN[n+m], in which n represents the $n^{th}$ sample and m represents the number of samples the replicated PRN code is phase shifted. Locally generated carriers are represented as $\cos[\Omega n]$ and $\sin[\Omega n]$ where $\Omega$ is the radian frequency. The correlation $R^2[m]$ is approximated by the following discrete sum:

$$R^2[m] = \left[\sum_{n=1}^{L} x[n] \cdot PRN[(n+m)_L] \cdot \cos[\Omega n]\right]^2 + \left[\sum_{n=1}^{L} x[n] \cdot PRN[(n+m)_L] \cdot \sin[\Omega n]\right]^2 \quad (1)$$

Where L is the number of samples per code. Serial search is considered a brute-force algorithm, that is, all possible combinations of code phases and Doppler offsets are tested and a correlation matrix is generated. A threshold is set and a satellite is acquired if the peak in the correlation results crosses the threshold. As shown in equation 1, a full correlation for each satellite may be performed by a sequence of matrix operations.

Step 1 includes two operations:

$$\begin{bmatrix} x[1] & \cdots & x[L] \\ \vdots & \vdots & \vdots \\ x[1] & \cdots & x[L] \end{bmatrix} \cdot * Carr_{sin} \quad (2)$$

$$\begin{bmatrix} x[1] & \cdots & x[L] \\ \vdots & \vdots & \vdots \\ x[1] & \cdots & x[L] \end{bmatrix} \cdot * Carr_{cos}$$

Where ".*" is element-wise multiply, $Carr_{sin}$ and $Carr_{cos}$ are locally generated carriers, $PRN_{mat}$ is the matrix of PRN code replicas with different code shifts, and L is the length of 1 ms baseband signal. Given the number of Doppler offsets D, the dimensions of $Carr_{sin}$ are D×L, the dimensions of $Carr_{cos}$ are D×L, and the dimensions of $PRN_{mat}$ are L×L. Each row in $Carr_{sin}$ and $Carr_{cos}$ corresponds to the carriers of a specific Doppler offset.

Step 2 includes multiplying the results of step 1 by PRNmat to obtain $R_I$ and $R_Q$, as follows:

$$R_I = \left[\begin{bmatrix} x[1] & \cdots & x[L] \\ \vdots & \vdots & \vdots \\ x[1] & \cdots & x[L] \end{bmatrix} \cdot * Carr_{sin}\right] \times PRN_{mat} \quad (3)$$

$$R_Q = \left[\begin{bmatrix} x[1] & \cdots & x[L] \\ \vdots & \vdots & \vdots \\ x[1] & \cdots & x[L] \end{bmatrix} \cdot * Carr_{cos}\right] \times PRN_{mat}$$

Step 3 is calculated by combining the squares of $R_I$ and $R_Q$ with the following equation:

$$R^2 = R_I^2 + R_Q^2 \quad (4)$$

Instead of shifting the raw signals, it is possible to circularly shift the PRN code replicas and hence a matrix of code replicas with different code phases may be generated offline. Theoretically, by shifting the code replicas 1 ms of baseband signal is enough for a correlation. In practice, in order to mitigate the data bit transition problem, two correlations are performed on two pieces of 1 ms of data, respectively. The two correlation results are aggregated by an element-wise addition. The calculations in equations (3)-(5) may be accelerated in three steps 1B, 2B, and 3B, according to the following equations:

$$R_1 = \begin{bmatrix} x[1] & \cdots & x[L] \\ \vdots & \vdots & \vdots \\ x[1] & \cdots & x[L] \end{bmatrix} \cdot * \begin{bmatrix} Carr_{sin} \\ Carr_{cos} \end{bmatrix} \quad (6)$$

$$\begin{bmatrix} R_I \\ R_Q \end{bmatrix} = R_1 \times PRN_{mat} \quad (7)$$

$$R^2 = R_I^2 + R_Q^2 \quad (8)$$

Step 1B (equation (6)) is an elementwise multiplication, step 2B (equation (7)) is a matrix multiplication, and step 3B (equation (8)) includes squaring and summing.

Therefore, the serial search problem has been transformed into three sub-tasks which are data-parallel and hence can be parallelized and accelerated by the GPU.

Figure 7:
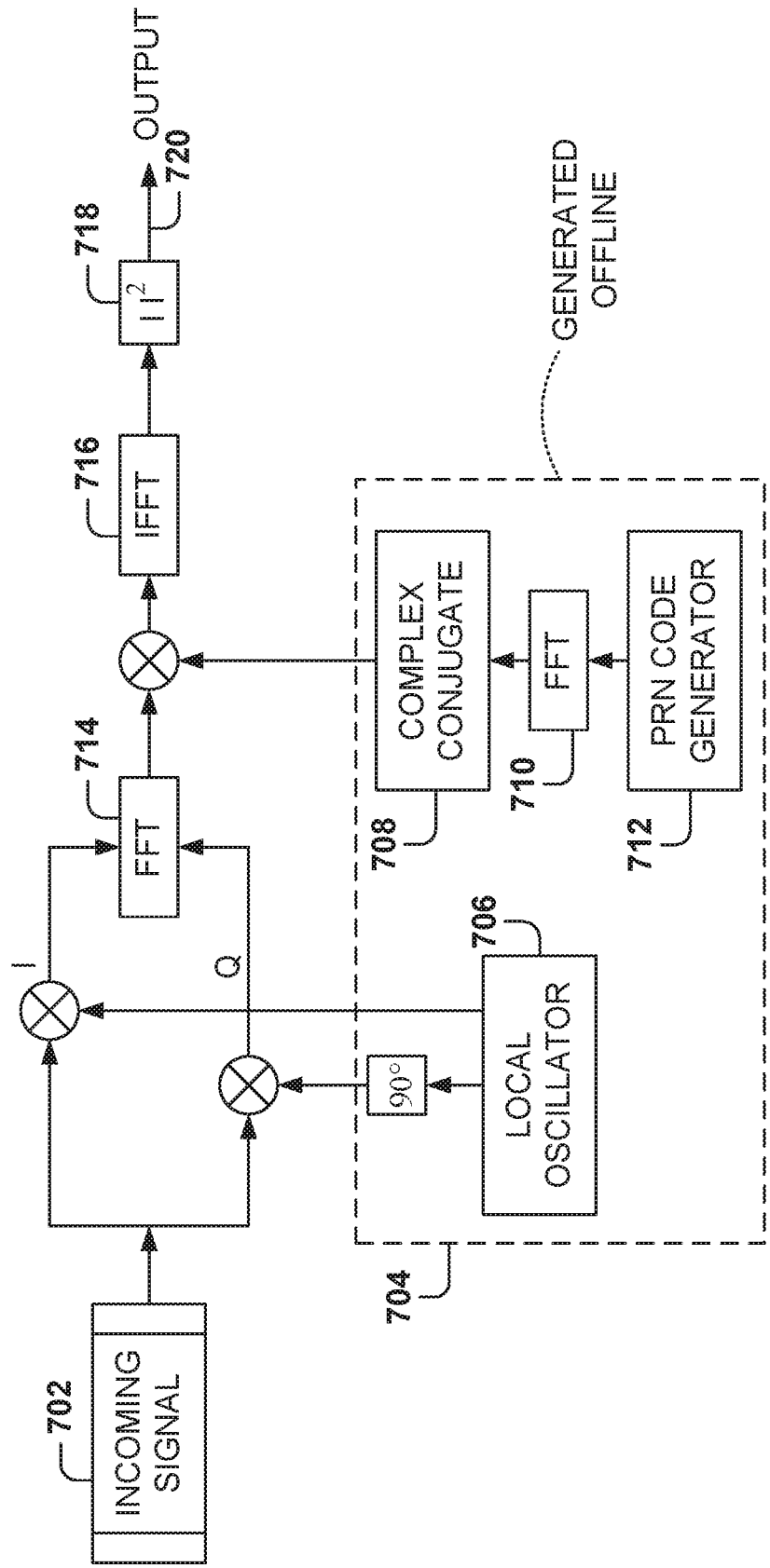
FIG. 7 is a block diagram of the parallel code phase search algorithm, according to some example embodiments.

FIG. 7 is a block diagram of the parallel code phase search algorithm, according to some example embodiments. In serial search acquisition, the received data are correlated with the replica code by circularly shifting the replicas. This resembles the circular convolution which is a multiplication in the frequency domain. Therefore, the correlation operation in equation (1) may be transformed to circular convolution as follows $$\sum_{n=1}^{L} x[n] \cdot PRN[(n+m)_L] = x \otimes PRN = \mathcal{F}^{-1}(\mathcal{F}(x) \cdot \mathcal{F}(PRN)^*) \quad (9)$$

Where $\otimes$ is a circular-convolution operation, $\square$ means discrete Fourier transform (DFT), $\square^{-1}$ is the inverse of $\square$, and ( )* represents the complex conjugate calculation.

The incoming signal 702 is mixed to baseband and the in-phase, and the quadrature components are used as the real and imaginary inputs when calculating the DFT, by performing the fast Fourier transform (FFT) 714. The result is multiplied by the complex conjugate 708 of DFT of the PRN code generated by PRN code generator 712 with the FFT at operation 710.

The circular convolution is obtained by taking the magnitude of the inverse DFT 716, via IFFT 716. The FFT algorithm is usually used to implement the DFT and the IDFT. Since the introduction of FFT eliminates the search on code phase dimension, thereby this acquisition method may be called parallel code phase search. After the IFFT, the signal is squared 718 to generate output 720.

The process of parallel code phase search acquisition for a single satellite can be formalized in five steps 1C-5C. Step 1C includes three operations (equations (10)-(12)), which are calculated as follows:

$$R'_I = \begin{bmatrix} x[1] & \cdots & x[L]] \\ \vdots & \vdots & \vdots \\ x[1] & \cdots & x[L]] \end{bmatrix} \cdot * Carr_{sin} \quad (10)$$

$$R'_Q = \begin{bmatrix} x[1] & \cdots & x[L]] \\ \vdots & \vdots & \vdots \\ x[1] & \cdots & x[L]] \end{bmatrix} \cdot * Carr_{cos} \quad (11)$$

$$R' = R'_I + R'_Q \cdot j \quad (12)$$

Step 2C is:

$$FFT(R') \quad (13)$$

Step 3C includes multiplying the result of step 2C, as follows:

$$FFT(R') \cdot * \begin{bmatrix} FFT(PRN)^* \\ \vdots \\ FFT(PRN)^* \end{bmatrix} \quad (14)$$

Step 4C builds on step 3C, as follows:

$$R'' = IFFT\left( FFT(R') \cdot * \begin{bmatrix} FFT(PRN)^* \\ \vdots \\ FFT(PRN)^* \end{bmatrix} \right) \quad (15)$$

Step 5C is getting absolute value and squaring:

$$R^2 = |R''|^2 \quad (16)$$

Theoretically, it is believed that the FFT search is about 2000 times faster than the serial search. Similar to serial search acquisition, it is possible to further parallelize the FFT search by partitioning the operations of steps 1C-5C into five steps 1D-5D.

Step 1D is an element-wise multiplication between incoming signals and the locally generated carriers for all Doppler offsets. Step 2D and Step 4D are the aforementioned FFT and IFFT. Step 3D is an element-wise multiplication between the incoming signal and PRN codes in frequency domain. As discussed above, both element-wise matrix operations as well as FFT and IFFT may be easily accelerated by the GPU.

Figure 8:
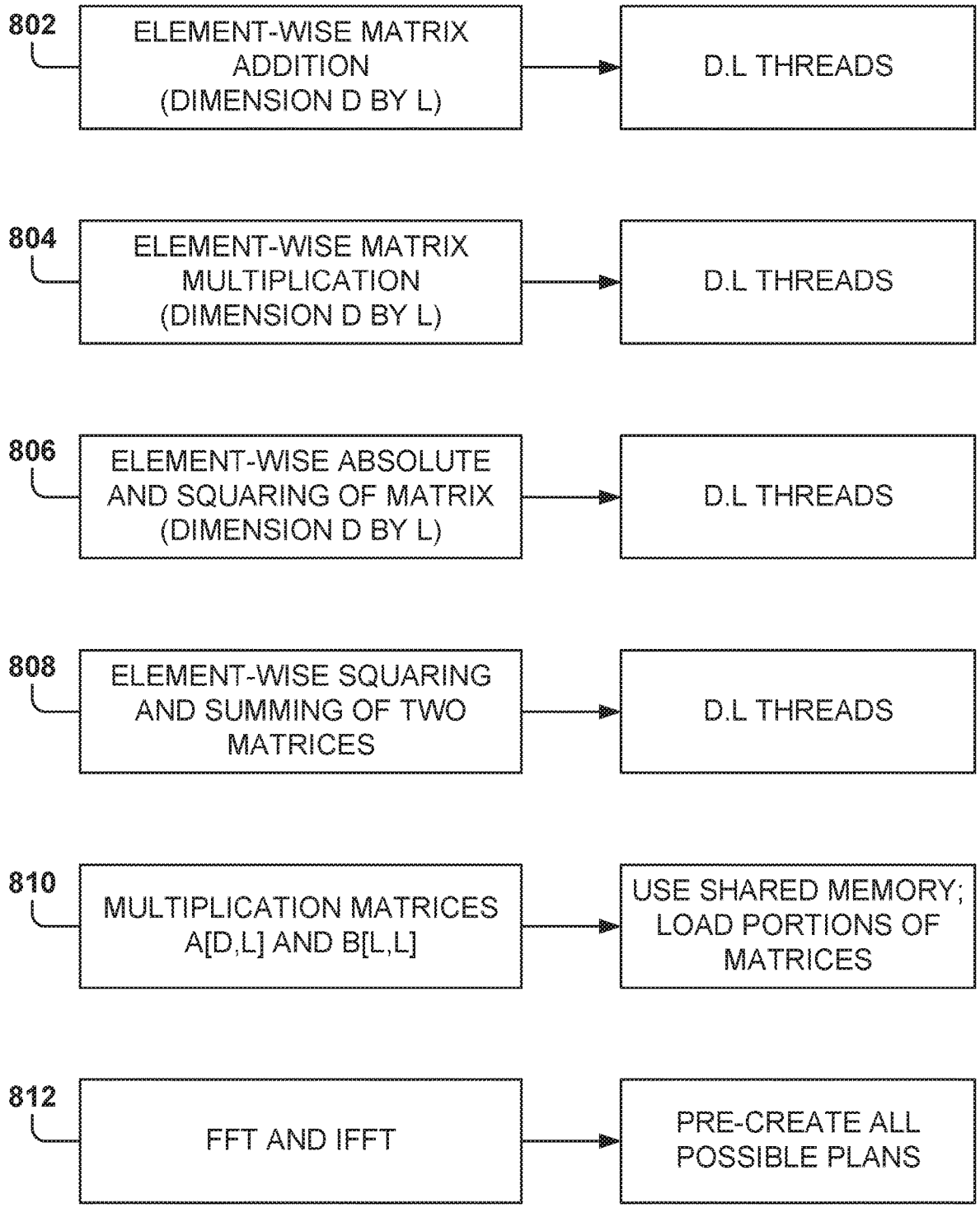
FIG. 8 illustrates the software architecture for performing acquisition tasks, according to some example embodiments.

FIG. 8 illustrates the software architecture for performing acquisition tasks, according to some example embodiments. The introduction of FFT in parallel code phase search acquisition eliminates the search on code phase dimension and it can be further improved based on the correlation spike that is insensitive to the sampling frequency of the GPS receiver. In other words, a spike is still observed in the correlation results from a visible satellite even with down sampling of the GPS signal. Thus, down sampling is a new way of energy saving for device-acquisition. The acquisition still captures the visible satellites after limited down sampling. However, the extracted Doppler frequency and code shift may be less accurate. Therefore, the down sampling is utilized in special cases, such as when the battery is running out.

As described above with reference to FIGS. 6 and 7, some operations (604 and 704) may be pre-generated offline. Specifically, the circularly shifted PRN codes of all 32 satellites and local carriers for all Doppler offsets are pre-generated in serial search acquisition. In parallel code phase acquisition, the PRN codes in frequency domain and local carriers are also generated offline.

As described in FIG. 6, the first task in the serial search acquisition is to multiply the incoming signal with the locally generated PRN code. Instead of generating the PRN code every time the algorithm is executed, all possible PRN codes are generated offline. Two ten-bit linear feedback shift registers (LFSRs), referred to as G1 and G2, generate maximum length PRN with a length of $2^{10}-1$, which is equal to 1023 bits.

Serial search acquisition involves multiplication of all possible shifted versions of the PRN codes. That is, besides saving the 32 possible PRN codes, all possible shifted versions may also be saved. In serial search acquisition, the second step is multiplication with a locally generated carrier wave. The carrier generator must generate two carrier signals with a phase difference of 90°, corresponding to a cosine and a sine wave. The carrier has a frequency corresponding to the IF±the frequency step, according to the examined frequency area. A complex signal is generated using the natural exponential function $e^{j2\pi f}$.

As for the parallel code phase search acquisition, the first step is to multiply the incoming signal with a locally generated cosine and sine carrier wave, respectively, giving an I and a Q signal component. Here, the PRN generator only generates one code with no code phase for each acquisition. The next step performs a Fourier transform of the PRN code, and the result is complex conjugated. For maximum computational efficiency, all the offline generated data are directly stored on the sensor node as binary files.

In some example embodiments, both the acquisition algorithm and the lazy acquisition strategy are implemented in the CUDA framework. The GPU is based on multithreaded streaming multiprocessors (SMs).

The SM creates, manages, schedules and executes threads in groups of 32 parallel threads called warps. Each warp executes on common instruction at a time. Further, in the CUDA programming model, the functionalities of threads are defined as kernels.

The hierarchy of threads is represented by block and cube. For convenience, threadIdx is a 3-component vector, so that threads can be identified using a one-dimensional, two-dimensional, or three-dimensional thread index. This provides a natural way to invoke computation across the elements in a domain such as a vector, matrix, or field.

In some example embodiments, the hierarchy of the threads affects the performance of the parallelization. However, this is not the case here because the GPU is running close to its full capacity. Therefore, a generic M 1024 structure is used for all the threads.

In some example embodiments, 1024 threads per block are used for all the element-wise matrix operations and the appropriate number of blocks are assigned according to the total number of threads required.

FIG. 8 illustrates some of the details of the CUDA implementations for serial search acquisition and parallel code phase search acquisition.

For the element-wise addition between two matrices A[D×L] (e.g., dimensions D×L) and B[D×L] 802, a total number of D times L (D·L) threads are created. Each thread handles A[i][j]+B[i][j], and the number of blocks M is D·L/1024.

For the element-wise multiplication between two matrices A[D×L] and B[D×L] 804, a total number of D·L threads are created. Each thread handles A[i][j]·B[i][j], and the number of blocks M is D·L/1024.

For the element-wise absolute and squaring of matrix A[D×L] 806, a total number of D·L threads are created. Each thread handles A[i][j]$^2$, and the number of blocks M is D·L/1024.

For the element-wise squaring and summing between two matrices A[D×L] and B[D×L] 808, a total number of D·L threads are created. Each thread handles A[i][j]$^2$+B[i][j]$^2$, and the number of blocks M is D·L/1024.

For the multiplication of two matrices A[D×L] and B[D×L] 810, cuBLAS and shared memory are utilized. In order to reduce the number of accesses to global memory, the threads load portions of matrices A and B into shared memory, where they can be accessed faster. In some example embodiments, the entire A and B matrices are loaded into the shared memory.

For calculating the FFT and the IFFT 812, a batch mode is used for 1D FFT and IFFT, and cuFFT is modeled after FFTW, an efficient CPU-based FFT library. FFTW provides a simple configuration mechanism, called a plan, that completely specifies the optimal plan of execution for a particular FFT size and data type. The advantage of this approach is that once a plan is created, the library stores whatever state is needed to execute the plan multiple times without recalculation of the configuration. In some instances, creating a plan is slow, probably because it is where the memory is allocated and transcendental functions are calculated. In some example embodiments, all the possible plans are pre-created initially and then reused afterwards as needed.

Figure 9:
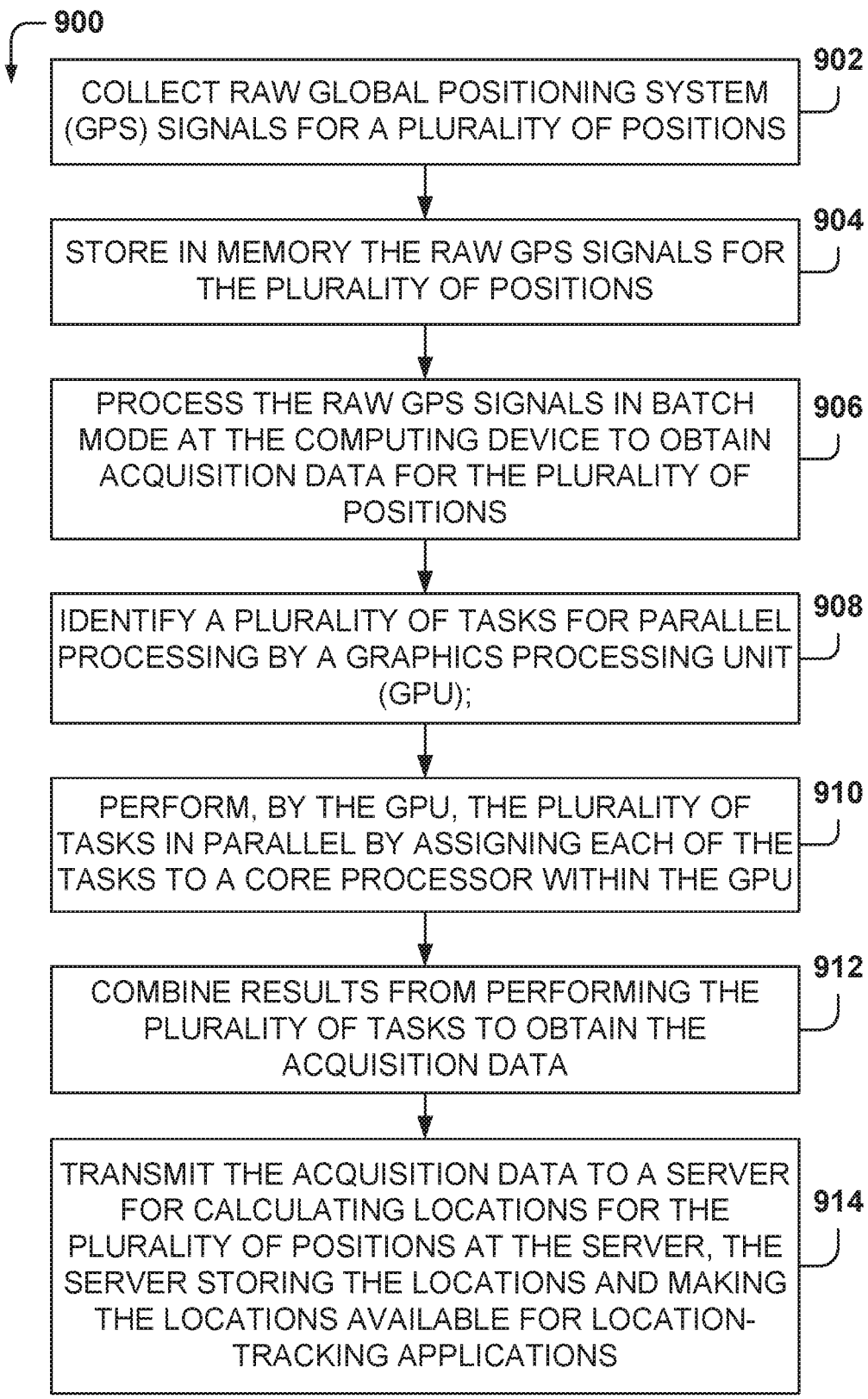
FIG. 9 is a flowchart of a method for cloud-offloaded position calculation with on-device acquisition, according to some example embodiments.

FIG. 9 is a flowchart of a method 900 for cloud-offloaded position calculation with on-device acquisition, according to some example embodiments. While the various operations in this flowchart are presented and described sequentially, one of ordinary skill will appreciate that some or all of the operations may be executed in a different order, be combined or omitted, or be executed in parallel.

Operation 902 is for collecting, by one or more processors of a computing device, raw GPS signals for a plurality of positions. From operation 902, the method flows to operation 904 for storing in memory, by the computing device, the raw GPS signals for the plurality of positions.

From operation 904, the method flows to operation 906 where the raw GPS signals are processed in batch mode at the computing device to obtain acquisition data for the plurality of positions. The processing further comprises operations 908, 910, and 912.

At operation 908, the one or more processors identify a plurality of tasks for parallel processing by a graphics processing unit (GPU). Operation 910, the GPU performs the plurality of tasks in parallel by assigning each of the tasks to a core processor within the GPU. Further, at operation 912, the one or more processors combine results from performing the plurality of tasks to obtain the acquisition data.

From operation 912, the method flows to operation 914 for transmitting, by the one or more processors, the acquisition data to a server for calculating locations for the plurality of positions at the server. The server stores the locations and makes the locations available for location-tracking applications.

In one example, the method 900 further includes waking up the GPU before processing the plurality of tasks, and putting the GPU to sleep after obtaining the acquisition data.

In one example, processing the raw GPS signals comprises a parallel code search. In one example, the parallel code search comprises: mixing an incoming signal to baseband and an in-phase signal, where quadrature components are used as real and imaginary inputs when calculating a DFT by performing a fast Fourier transform (FFT) to obtain a first result; multiplying the first result by a complex conjugate of DFT of a PRN code generated by a PRN code generator to obtain a second result; performing an inverse fast Fourier transform (IFFT) of the second result to obtain a third result; and obtaining a square of the third result to obtain the acquisition data.

In one example, the transmitted acquisition data comprises timestamps, Doppler, and phase shift information.

In one example, the raw GPS signals include 2 ms of GPS baseband signal.

In one example, processing the raw GPS signals comprises a serial search acquisition, where the serial search acquisition comprises: multiplying an incoming signal by a locally generated PRN sequence to obtain a first result, multiplying the first result by a locally generated carrier signal to obtain an in-phase signal I, and multiplying the first result by a 90° phase-shifted version of a locally generated carrier to generate a quadrature signal Q, integrating the I and Q signals over 1 ms, and squaring the integrated I and Q signals to obtain the acquisition data.

In some experiments, the results show that CODA-GPS can dramatically reduce the data transfers and enjoy the benefits of cloud offloading at the same time, without compromising energy efficiency and localization accuracy. Further, the experiments show that it is possible to use GPU for low-power embedding applications.

Figure 10:
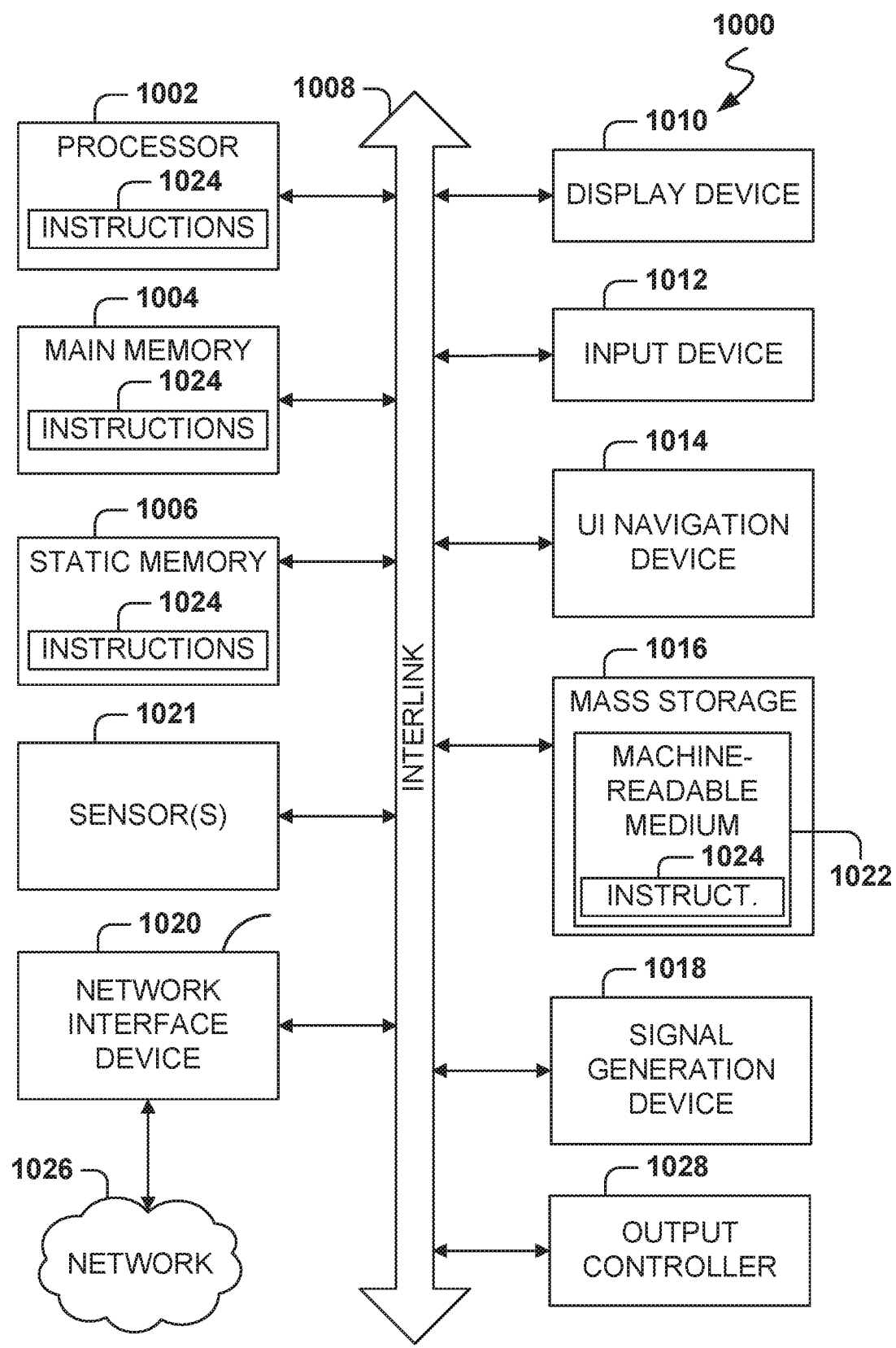
FIG. 10 is a block diagram illustrating an example of a machine upon which one or more example embodiments may be implemented.

FIG. 10 is a block diagram illustrating an example of a machine 1000 upon which one or more example embodiments may be implemented. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a laptop, a mobile telephone, a web appliance, a network router, switch or bridge, or any machine capable of executing instructions (sequential or otherwise) that specify actions to be taken by that machine. Further, while only a single machine 1000 is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1000 may include a hardware processor 1002 (e.g., a central processing unit (CPU), a graphics processing unit (GPU), a hardware processor core, or any combination thereof), a main memory 1004, and a static memory 1006, some or all of which may communicate with each other via an interlink (e.g., bus) 1008. The machine 1000 may further include a display device 1010, an alphanumeric input device 1012 (e.g., a keyboard), and a UI navigation device 1014 (e.g., a mouse). In an example, the display device 1010, input device 1012, and UI navigation device 1014 may be a touchscreen display. The machine 1000 may additionally include a mass storage device (e.g., drive unit) 1016, a signal generation device 1018 (e.g., a speaker), a network interface device 1020, and one or more sensors 1021, such as a GPS sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the mass storage device 1016 may constitute machine-readable media.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

The term "machine-readable medium" may include any medium that is capable of storing, encoding, or carrying instructions 1024 for execution by the machine 1000 and that causes the machine 1000 to perform any one or more of the techniques of the present disclosure, or that is capable of storing, encoding or carrying data structures used by or associated with such instructions 1024. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, wireless data networks (e.g., Institute of Electrical and Electronics Engineers (IEEE) 1002.11 family of standards known as Wi-Fi®, IEEE 1002.16 family of standards known as WiMax®), IEEE 1002.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 1024 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   collecting, by one or more processors of a computing device, raw global positioning system (GPS) signals for a plurality of positions;
   storing in memory, by the computing device, the raw GPS signals for the plurality of positions;
   processing the raw GPS signals in batch mode at the computing device to obtain acquisition data for the plurality of positions, the acquisition data comprising timestamps of the acquisition data, visible satellites, carrier frequencies of the visible satellites, and code phase of visible satellite signals, the processing further comprising:
   identifying, by the one or more processors, a plurality of tasks for parallel processing by a graphics processing unit (GPU), the plurality of tasks comprising identifying the code phase of the visible satellite signals;
   performing, by the GPU, the plurality of tasks in parallel by assigning each of the tasks to a core processor within the GPU; and
   combining, by the one or more processors, results from performing the plurality of tasks to obtain the acquisition data; and
   transmitting, by the one or more processors, the acquisition data to a server for calculating locations for the plurality of positions at the server, the server storing the locations and making the locations available for location-tracking applications.

2. The method as recited in claim 1, further comprising:
   waking up the GPU before processing the plurality of tasks; and
   putting the GPU to sleep after obtaining the acquisition data.

3. The method as recited in claim 1, wherein processing the raw GPS signals comprises a parallel code search.

4. The method as recited in claim 3, wherein the parallel code search comprises:
   mixing an incoming signal to baseband and an in-phase signal, where quadrature components are used as real and imaginary inputs when calculating a DFT by performing a fast Fourier transform (FFT) to obtain a first result; and
   multiplying the first result by a complex conjugate of DFT of a PRN code generated by a PRN code generator to obtain a second result.

5. The method as recited in claim 4, wherein the parallel code search further comprises:
   performing an inverse fast Fourier transform (IFFT) of the second result to obtain a third result; and
   obtaining a square of the third result to obtain the acquisition data.

6. The method as recited in claim 1, wherein the transmitted acquisition data further comprises Doppler information.

7. The method as recited in claim 1, wherein the raw GPS signals include 2 ms of GPS baseband signal.

8. The method as recited in claim 1, wherein processing the raw GPS signals comprises a serial search acquisition.

9. The method as recited in claim 8, wherein the serial search acquisition comprises:
   multiplying an incoming signal by a locally generated PRN sequence to obtain a first result;
   multiplying the first result by a locally generated carrier signal to obtain an in-phase signal I; and
   multiplying the first result by a 90° phase-shifted version of a locally generated carrier to generate a quadrature signal Q.

10. The method as recited in claim 9, wherein the serial search acquisition further comprises:
    integrating the I and Q signals over 1 ms; and
    squaring the integrated I and Q signals to obtain the acquisition data.

11. A system comprising:
    a memory comprising instructions;
    a graphics processing unit (GPU); and
    one or more computer processors, wherein the instructions, when executed by the one or more computer processors, cause the one or more computer processors to perform operations comprising:
    collecting raw GPS signals for a plurality of positions;
    storing in the memory the raw GPS signals for the plurality of positions;
    processing the raw GPS signals in batch mode to obtain acquisition data for the plurality of positions, the acquisition data comprising timestamps of the acquisition data, visible satellites, carrier frequencies of the visible satellites, and code phase of visible satellite signals, the processing further comprising:
    identifying a plurality of tasks for parallel processing by the GPU, the GPU performing the plurality of tasks in parallel by assigning each of the tasks to a core processor within the GPU, the plurality of tasks comprising identifying the code phase of the visible satellite signals; and
    combining results from performing the plurality of tasks to obtain the acquisition data; and
    transmitting the acquisition data to a server for calculating locations for the plurality of positions at the server, the server storing the locations and making the locations available for location-tracking applications.

12. The system as recited in claim 11, wherein the instructions further cause the one or more computer processors to perform operations comprising:
    waking up the GPU before processing the plurality of tasks; and
    putting the GPU to sleep after obtaining the acquisition data.

13. The system as recited in claim 11, wherein processing the raw GPS signals comprises a parallel code search, wherein the parallel code search comprises:
    mixing an incoming signal to baseband and an in-phase signal, where quadrature components are used as real and imaginary inputs when calculating a DFT by performing a fast Fourier transform (FFT) to obtain a first result; and
    multiplying the first result by a complex conjugate of DFT of a PRN code generated by a PRN code generator to obtain a second result.

14. The system as recited in claim 13, wherein the parallel code search further comprises:
    performing an inverse fast Fourier transform (IFFT) of the second result to obtain a third result; and
    obtaining a square of the third result to obtain the acquisition data.

15. The system as recited in claim 11, wherein the transmitted acquisition data further comprises Doppler information.

16. A non-transitory machine-readable storage medium including instructions that, when executed by a machine, cause the machine to perform operations comprising:
    collecting, by one or more processors of a computing device, raw global positioning system (GPS) signals for a plurality of positions;
    storing in memory, by the computing device, the raw GPS signals for the plurality of positions;
    processing the raw GPS signals in batch mode at the computing device to obtain acquisition data for the plurality of positions, the acquisition data comprising timestamps of the acquisition data, visible satellites, carrier frequencies of the visible satellites, and code phase of visible satellite signals, the processing further comprising:
        identifying, by the one or more processors, a plurality of tasks for parallel processing by a graphics processing unit (GPU), the plurality of tasks comprising identifying the code phase of the visible satellite signals;
        performing, by the GPU, the plurality of tasks in parallel by assigning each of the tasks to a core processor within the GPU; and
        combining, by the one or more processors, results from performing the plurality of tasks to obtain the acquisition data; and
    transmitting, by the one or more processors, the acquisition data to a server for calculating locations for the plurality of positions at the server, the server storing the locations and making the locations available for location-tracking applications.

17. The machine-readable storage medium as recited in claim 16, wherein the machine further performs operations comprising:
    waking up the GPU before processing the plurality of tasks; and
    putting the GPU to sleep after obtaining the acquisition data.

18. The machine-readable storage medium as recited in claim 16, wherein processing the raw GPS signals comprises a parallel code search, wherein the parallel code search comprises:
    mixing an incoming signal to baseband and an in-phase signal, where quadrature components are used as real and imaginary inputs when calculating a DFT by performing a fast Fourier transform (FFT) to obtain a first result; and
    multiplying the first result by a complex conjugate of DFT of a PRN code generated by a PRN code generator to obtain a second result.

19. The machine-readable storage medium as recited in claim 18, wherein the parallel code search further comprises:
    performing an inverse fast Fourier transform (IFFT) of the second result to obtain a third result; and
    obtaining a square of the third result to obtain the acquisition data.

20. The machine-readable storage medium as recited in claim 16, wherein the transmitted acquisition data further comprises Doppler information.

* * * * *